United States Patent
Castro Castro et al.

(10) Patent No.: US 9,363,837 B2
(45) Date of Patent: Jun. 7, 2016

(54) ESTABLISHING A COMMUNICATION SESSION

(71) Applicant: Telefonaktiebolaget L M Ericsson (publ), Stockholm (SE)

(72) Inventors: Fabian Castro Castro, Madrid (ES); Ana Maria Lopez Nieto, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 26 days.

(21) Appl. No.: 14/282,186

(22) Filed: May 20, 2014

(65) Prior Publication Data

US 2014/0254484 A1    Sep. 11, 2014

Related U.S. Application Data

(62) Division of application No. 13/320,864, filed as application No. PCT/EP2009/056093 on May 19, 2009, now Pat. No. 8,769,113.

(51) Int. Cl.
*G06F 15/16* (2006.01)
*H04W 76/02* (2009.01)
(Continued)

(52) U.S. Cl.
CPC .............. *H04W 76/02* (2013.01); *H04L 12/14* (2013.01); *H04L 12/1471* (2013.01); *H04L 65/1016* (2013.01); *H04M 15/00* (2013.01); *H04M 15/07* (2013.01); *H04M 15/57* (2013.01); *H04M 15/66* (2013.01); *H04M 15/8228* (2013.01); *H04M 15/85* (2013.01); *H04M 15/851* (2013.01); *H04W 72/087* (2013.01); *H04M 2215/0168* (2013.01); *H04M 2215/208* (2013.01); *H04M 2215/2013* (2013.01); *H04M 2215/22* (2013.01);

(Continued)

(58) Field of Classification Search
CPC .............. H04L 29/06; H04L 29/08576; H04L 29/0809
USPC ........................................................ 709/227
See application file for complete search history.

(56) References Cited

U.S. PATENT DOCUMENTS

| | | | | |
|---|---|---|---|---|
| 7,206,397 | B1 * | 4/2007 | Kalmanek, Jr. ..... | H04L 12/5695 379/219 |
| 8,442,227 | B1 * | 5/2013 | Yoakum ............ | H04L 29/08576 380/249 |

(Continued)

OTHER PUBLICATIONS

3rd Generation Partnership Project. 3GPP TS 23.203, V8.1.1 (Mar. 2008). 3rd Generation Partnership Project; Technical Specification Group Services and System Aspects; Policy and charging control architecture (Release 8). Mar. 2008, pp. 1-87.

*Primary Examiner* — Razu A Miah
(74) *Attorney, Agent, or Firm* — Coats & Bennett, PLLC

(57) ABSTRACT

A method for operating an IP Multimedia Subsystem Application Server to facilitate a communication session between a first user and a second user at a required Quality of Service (QoS) is provided. The method calls for receiving a notification that a Policy and Charging Rules function (PCRF) associated with the first user has not authorized the required QoS. The notification includes an indication of additional QoS required by the first user in order to achieve the required QoS. Authorization for the additional QoS for the first user is then requested from a PCRF associated with the second user. The method then calls for receiving a notification that the PCRF associated with the second user has authorized the additional QoS, and notifying the PCRF associated with the first user that the additional QoS has been authorized for the first user.

10 Claims, 10 Drawing Sheets

(51) Int. Cl.
*H04L 12/14* (2006.01)
*H04M 15/00* (2006.01)
*H04L 29/06* (2006.01)
*H04W 72/08* (2009.01)

(52) U.S. Cl.
CPC ... *H04M 2215/64* (2013.01); *H04M 2215/7833* (2013.01); *H04M 2215/815* (2013.01)

(56) References Cited

U.S. PATENT DOCUMENTS

| | | | | |
|---|---|---|---|---|
| 2002/0062379 | A1* | 5/2002 | Widegren | H04L 29/06 709/227 |
| 2002/0087393 | A1* | 7/2002 | Philonenko | G06Q 10/06395 705/7.41 |
| 2002/0114305 | A1* | 8/2002 | Oyama | H04L 29/06 370/338 |
| 2002/0133600 | A1* | 9/2002 | Williams | H04L 29/06 709/228 |
| 2006/0206619 | A1* | 9/2006 | Dan | G06F 21/6218 709/233 |
| 2008/0049648 | A1* | 2/2008 | Liu | H04L 65/80 370/310 |
| 2008/0083013 | A1 | 4/2008 | Soliman et al. | |
| 2008/0273520 | A1 | 11/2008 | Kim et al. | |
| 2009/0116627 | A1 | 5/2009 | Ropolyi | |
| 2009/0196225 | A1 | 8/2009 | Avila Gonzalez et al. | |
| 2009/0201912 | A1* | 8/2009 | Minodier | H04L 63/08 370/352 |
| 2009/0204713 | A1* | 8/2009 | Beziot | H04L 65/1016 709/228 |
| 2009/0228956 | A1* | 9/2009 | He | H04L 63/20 726/1 |
| 2009/0268720 | A1* | 10/2009 | Veenstra | H04L 29/06319 370/352 |
| 2009/0271512 | A1 | 10/2009 | Jorgensen | |
| 2010/0257582 | A1 | 10/2010 | Castellanos Zamora et al. | |
| 2010/0287285 | A1 | 11/2010 | Castellanos Zamora et al. | |
| 2011/0093613 | A1* | 4/2011 | Banes | H04L 29/06 709/238 |
| 2012/0142278 | A1* | 6/2012 | Wang | H04W 36/0016 455/68 |
| 2013/0170473 | A1* | 7/2013 | Liu | H04W 36/30 370/331 |

* cited by examiner

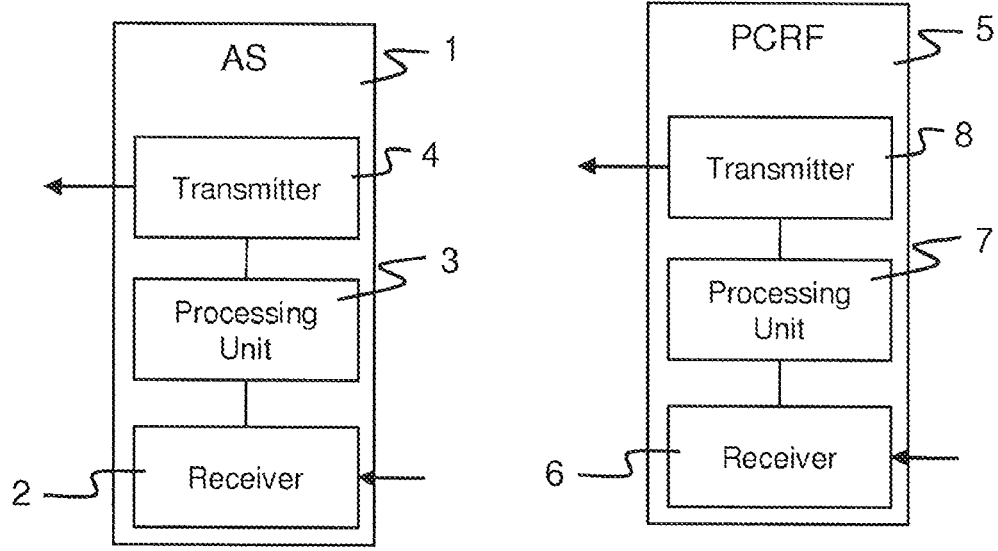
Figure 9
Figure 10
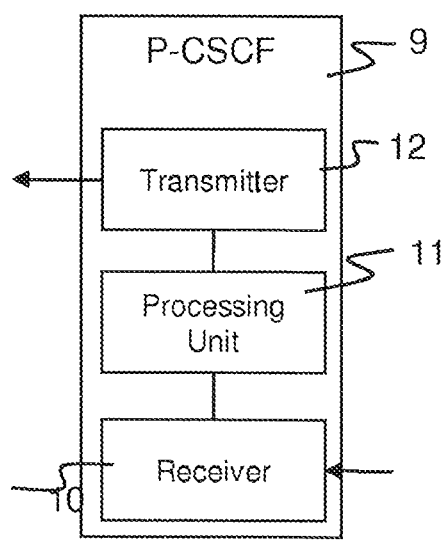
Figure 11

ESTABLISHING A COMMUNICATION SESSION

CROSS-REFERENCE TO RELATED APPLICATIONS

This application is a divisional of U.S. application Ser. No. 13/320,864, which is the National Stage of International Application No. PCT/EP2009/056093, filed May 19, 2009. Each of the '864 and '093 applications are expressly incorporated herein by reference in their entirety.

TECHNICAL FIELD

The present invention relates to a method of establishing a communication session. More particularly, the invention relates to increasing the Quality of Service available to a user for the duration of a communications session.

BACKGROUND

Telecommunications services provided over an IP Connectivity Access Network (IP-CAN) can be subject to charging and policy control mechanisms. This includes Quality of Service (QoS) control. Accordingly, some telecommunications systems incorporate Policy and Charging Control (PCC) architectures to provide this control. 3GPP TS 23.203 V8.1.1 describes such a PCC architecture in respect of packet flows in an IP-CAN session established by a user terminal through an Evolved 3GPP telecommunications system, including both 3GPP accesses (GERAN/UTRAN/E-UTRAN) and Non-3GPP accesses. FIG. 1 illustrates schematically an example of the PCC architecture described in 3GPP TS 23.203 that comprises a Policy and Charging Enforcement Function (PCEF), a Bearer Binding and Event Reporting Function (BBERF), a Policy and Charging Rules Function (PCRF), an Application Function (AF), an Online Charging System (OCS), an Offline Charging System (OFCS) and the Subscription Profile Repository (SPR).

The PCEF is a functional entity that behaves as a Policy Enforcing Point (PEP) for enforcing decisions instructed by the PCRF and the OCS. The PCEF captures any user and signalling traffic, and analyzes that traffic to identify the user and to capture details of the service(s) being used. The PCEF can then communicate this information to the PCRF over the Gx interface, to the OCS over the Gy interface and to the OFCS over the Gz interface. The PCEF is preferably co-located within the gateway node implementing the IP access to the PDN. As such, in a GPRS core network the PCEF is located within the GPRS Gateway Support Node (GGSN), whilst in the case of a CDMA2000 network the PCEF may be located in a Packet Data Serving Node (PDSN).

The OCS provides authorization for the usage of network resources based on the provisioned data and the user activity information it receives from PCEF. This authorization must be granted by the OCS prior to the actual resource usage. When receiving a network resource usage request, the network assembles the relevant charging information and generates a charging event towards the OCS in real-time. The OCS then returns an appropriate resource usage authorization over the Gy interface. The resource usage authorization may be limited in its scope (e.g. volume of data or duration) therefore this authorization may have to be renewed from time to time as long as the user's resource usage persists. The OCS can support time, volume and event-based charging.

The AF is an element offering applications that require policy and/or charging control of the IP-CAN user plane behaviour. The AF communicates with the PCRF over the Rx interface to transfer dynamic session information, required for PCRF decisions as well as to receive IP-CAN specific information and notifications about IP-CAN bearer level events. One example of an AF is the P-CSCF of the IP Multimedia Core Network (IM CN) subsystem. In the case of a P-CSCF, the information communicated over the Rx interface is derived from the P-CSCF session information (e.g. SDP when SIP is used for signalling) and it mainly includes media components. A media component comprises a set of IP flows, each of which is described by a 5-tuple, the media type and required bandwidth.

The PCRF can be implemented as a standalone node and behaves as a Policy Decision Point (PDP), or Policy Server (PS), that stores user data related to QoS enforcement, access control lists, etc. The PCRF provides policy and charging control for the media components negotiated between the user terminal and the AF. The PCRF provides network control regarding the service data flow detection, gating, QoS and flow based charging (except credit management) towards the PCEF. The QoS information that PCRF downloads to the PCEF includes the QoS class identifier (authorized QoS class for the service data flow), the Allocation and Retention Priority (ARP) and authorized bitrates for uplink and downlink. Once a decision is taken in PCRF, this decision is indicated to the PCEF by means of the Gx interface.

The SPR contains all subscriber/subscription related information needed for subscription-based policies and IP-CAN bearer level charging rules by the PCRF. The Sp interface allows the PCRF to request subscription information related to the IP-CAN transport level policies from the SPR based on a subscriber ID and other IP-CAN session attributes.

Network operators offer a variety of different types of subscription to users, each of which can have a different QoS and/or usage limits. For example, one subscription type may provide the user with a bandwidth limit of 1 Mbps for the first 1 Gb of data, after which the bandwidth is then downgraded to 128 Kbps. An alternative subscription type may provide a bandwidth limit of 3 Mbps for the first 5 Gb of data, after which there is no access to any services other than the operators portal. Therefore the QoS level received by the user will depend on what he/she is willing to pay. Although the examples above only define the bandwidth limit QoS parameter, the user's subscription type can also define other QoS parameters, such as the QoS Class Identifier (QCI), traffic delay, etc.

For certain types of services there may be a preferred or required minimum QoS. For example in a video conference it is essential to provide a sufficiently high bandwidth to all the participating users. FIG. 2 is an example signalling flow diagram of a video conference negotiation in an IM CN subsystem. In this example, two users are negotiating a video conference. The subscription of one of the users provides a bandwidth restricted below the QoS required for the video conference, such that the negotiation fails and the session is aborted. The steps performed are as follows:

A1. A SIP INVITE is sent from the originating user terminal (UE A) to a terminating user terminal (UE B). The SIP INVITE is routed via P-CSCF A associated with UE A to a Telephony Application Server (TAS) and onto P-CSCF B associated with UE B.

A2. UE B returns a 183 Session Progress message to P-CSCF B.

A3. P-CSCF B then sends an Authenticate and Authorize Request (AAR) message to PCRF B to authorize the required QoS.

A4. In this example, PCRF B does not authorise the QoS because the subscription of user B of UE B does not allow the QoS required for the session (e.g. if the user's maximum bandwidth=1 Mbps and the video conference requested bandwidth=2 Mbps). PCRF B sends the rejection to P-CSCF B in an Authenticate and Authorize Answer (AAA) message.

A5. The P-CSCF B sends a BYE message to the UE A and UE B to inform them that the session has been terminated.

Alternatively, it could be the case that, despite the restricted bandwidth, the service is allowed. However, without the desired QoS, it is likely that the service experienced by both users will be poor. In a further alternative, both users may initially negotiate and agree a certain QoS. However, during the session one of the users may be downgraded to a lower QoS, for example, the user may have exceeded their usage limit. In this case, whilst the session is not interrupted, the service will be degraded and this degradation will be perceived by both users.

In summary, whilst the limitations on the QoS available to a user, due to the restrictions of their subscription, will limit the services available to that user, they may also limit the services or QoS available to other users who wish to communicate with that user.

SUMMARY

According to a first aspect of the present invention there is provided a method of operating an IP Multimedia Subsystem Application Server to facilitate a communication session between a first user and a second user at a required Quality of Service. The method comprises receiving a notification that a Policy and Charging Rules function associated with the first user has not authorised said required Quality of Service, the notification including an indication of additional Quality of Service required by the first user in order to achieve said required Quality of Service, requesting authorisation, from a Policy and Charging Rules function associated with the second user, for the additional Quality of Service for the first user, receiving a notification that the Policy and Charging Rules function associated with the second user has authorised said additional Quality of Service, and notifying the Policy and Charging Rules function associated with the first user that the additional Quality of Service has been authorised for the first user.

As a result, a session communication between the first and second user can be successfully established even if the QoS available to the first user is insufficient/inadequate for a particular session. As such, this method provides that the limitations on the QoS available to a user, due to the restrictions of their subscription, will not limit the services or QoS available to other users who wish to communicate with that user.

The method may also comprise, prior to requesting authorisation for the upgraded Quality of Service, requesting whether or not the second user is willing to provide the additional Quality of Service for the first user, receiving a response from the second user, and, if the second user is willing, proceeding to request authorisation for the additional Quality of Service.

According to a second aspect of the present invention there is provided a method of operating a Policy and Charging Rules Function associated with a first user to establish a communication session between the first user and a second user at a required Quality of Service. The method comprises receiving a Quality of Service authorisation request, the request including said required Quality of Service required by the first user and an additional Quality of Service required by the second user, determining if a subscription of the first user allows sufficient Quality of Service for both the required Quality of Service and the additional Quality of Service; and, if so, responding to the request with an indication that the required Quality of Service and the additional Quality of Service have been authorised.

If the subscription of the first user does allow sufficient Quality of Service for both the required Quality of Service and the additional Quality of Service, the Quality of Service available to the first user may be reduced by an amount equivalent to the additional Quality of Service for the duration of the session.

If the subscription of the first user does not allow sufficient Quality of Service for both the required Quality of Service and the additional Quality of Service, the method may comprise determining if the subscription of the first user can be upgraded, at the cost of the first user, in order to provide the required Quality of Service for the first user and the additional Quality of Service required by the second user, and if so, upgrading the subscription of the first user, and responding to the request with an indication that the required Quality of Service and the additional Quality of Service have been authorised.

The step of determining if the subscription of the first user can be upgraded may comprise determining whether or not permission to upgrade the subscription of the first user has been pre-configured for the first user. The step of determining if the subscription of the first user can be upgraded may also comprise sending a message to the first user requesting permission to upgrade their subscription.

According to a third aspect of the present invention there is provided a method of operating a Policy and Charging Rules Function associated with a first user to control the establishment of a communication session between the first user and a second user at a required Quality of Service. The method comprises receiving a Quality of Service authorisation request, the request including said required Quality of Service required by the first user, determining if a subscription of the first user allows sufficient Quality of Service for the required Quality of Service, and if not, determining the additional Quality of Service required by the first user in order to achieve said required Quality of Service, and responding to the request with an indication that the desired Quality of Service has not been authorised and including the additional QoS required by the first user.

The method may further comprise receiving a further Quality of Service authorisation request, the request including said required Quality of Service required by the first user and an indication that the additional Quality of Service has been authorised by a Policy and Charging Rules function associated with the second user, determining if a combination of the Quality of Service allowed by a subscription of the first user and the additional Quality of Service is sufficient for the required Quality of Service, and if so, responding to the request with an indication that the required Quality of Service has been authorised.

If the combination of the Quality of Service allowed by a subscription of the first user and the additional Quality of Service is sufficient for the required Quality of Service, then the Quality of Service available to the first user may be increased by an amount equivalent to the additional Quality of Service for the duration of the session.

According to a fourth aspect of the present invention there is provided a method of operating an IP Multimedia Subsystem Proxy Call Session Control Function associated with a first user to facilitate a communication session between the first user and a second user at a required Quality of Service. The method comprises receiving a request from an Application Server that the first user obtain authorisation, from a Policy and Charging Rules function associated with the first user, for additional Quality of Service for the second user in order that the second user can achieve the required Quality of Service, sending a Quality of Service authorisation request, to the Policy and Charging Rules function associated with the first user, the request including said required Quality of Service and the additional Quality of Service, receiving a response to the request, the response including an indication that the required Quality of Service and the additional Quality of Service have been authorised, and notifying the Application Server that the Policy and Charging Rules function associated with the second user has authorised said additional Quality of Service.

Prior to receiving a request from an Application Server that the first user obtain authorisation for additional Quality of Service, the method may further comprise receiving a message from the Application Server to request whether or not the first user is willing to provide the additional Quality of Service for the second user, sending a message to the first user requesting whether or not the first user is willing to provide the additional Quality of Service for the second user, receiving a response from the first user, and notifying the Application Server of the response.

According to a fifth aspect of the present invention there is provided a method of operating an IP Multimedia Subsystem Proxy Call Session Control Function associated with a first user to facilitate a communication session between the first user and a second user at a required Quality of Service. The method comprises receiving a request from an Application Server to obtain authorisation, from a Policy and Charging Rules function associated with the first user, for the required Quality of Service, the request including an indication that additional Quality of Service has been authorised by a Policy and Charging Rules function associated with the second user, sending a Quality of Service authorisation request, to the Policy and Charging Rules function associated with the first user, the request including said required Quality of Service and an indication that the additional Quality of Service has been authorised, receiving a response to the request, the response including an indication that the required Quality of Service has been authorised for the first user, and notifying the Application Server that the Policy and Charging Rules function associated with the first user has authorised the required Quality of Service.

According to a sixth aspect of the present invention there is provided an apparatus configured to operate as an IP Multimedia Subsystem Application Server for facilitating a communication session between a first user and a second user at a required Quality of Service. The apparatus comprises a receiver for receiving a notification that a Policy and Charging Rules function associated with the first user has not authorised said required Quality of Service, the notification including an indication of additional Quality of Service required by the first user in order to achieve said required Quality of Service, a processing unit for generating a request for authorisation for the additional Quality of Service for the first user, a transmitter for sending the authorisation request, a receiver for receiving a notification that the Policy and Charging Rules function associated with the second user has authorised said additional Quality of Service, and a transmitter for notifying the Policy and Charging Rules function associated with the first user that the additional Quality of Service has been authorised for the first user.

The apparatus may further comprise a transmitter for requesting whether or not the second user is willing to provide the additional Quality of Service for the first user, and a receiver for receiving a response from the second user.

According to a seventh aspect of the present invention there is provided an apparatus configured to operate as a Policy and Charging Rules Function associated with a first user for establishing a communication session between the first user and a second user at a required Quality of Service. The apparatus comprises a receiver for receiving a Quality of Service authorisation request, the request including said required Quality of Service and an additional Quality of Service required by the second user, a processing unit for determining if a subscription of the first user allows sufficient Quality of Service for both the required Quality of Service and the additional Quality of Service, and a transmitter for responding to the request with an indication that the required Quality of Service and the additional Quality of Service have been authorised.

The processing unit may be arranged to reduce the Quality of Service available to the first user for the duration of the session, by an amount equivalent to the additional Quality of Service, if the subscription of the first user does allow sufficient Quality of Service for both the required Quality of Service and the additional Quality of Service. The processing unit may be further arranged to determine if the subscription of the first user can be upgraded, at the cost of the first user, in order to provide the required Quality of Service for the first user and the additional Quality of Service required by the second user, and if so, to upgrade the subscription of the first user.

According to an eighth aspect of the present invention there is provided an apparatus configured to operate as a Policy and Charging Rules Function associated with a first user for controlling the establishment of a communication session between the first user and a second user at a required Quality of Service. The apparatus comprises a receiver for receiving a Quality of Service authorisation request, the request including said required Quality of Service, a processing unit for determining if a subscription of the first user allows sufficient Quality of Service for the required Quality of Service, and, if not, for determining the additional Quality of Service required by the first user in order to achieve said required Quality of Service, and a transmitter for responding to the request with an indication that the required Quality of Service has not been authorised and including the additional QoS.

The apparatus may further comprise a receiver for receiving a further Quality of Service authorisation request, the request including said required Quality of Service and an indication that the additional Quality of Service has been authorised by a Policy and Charging Rules function associated with the second user, a processing unit for determining if a combination of the Quality of Service allowed by a subscription of the first user and the additional Quality of Service is sufficient for the required Quality of Service, and a transmitter for responding to the request with an indication that the required Quality of Service has been authorised.

The processing unit may be arranged to increase the Quality of Service available to the first user for the duration of the session, by an amount equivalent to the additional Quality of Service, if the combination of the Quality of Service allowed by a subscription of the first user and the additional Quality of Service is sufficient for the required Quality of Service.

According to a ninth aspect of the present invention there is provided an apparatus configured to operate as an IP Multimedia Subsystem Proxy Call Session Control Function associated with a first user for facilitating a communication session between the first user and a second user at a required Quality of Service. The apparatus comprises a receiver for receiving a request from an Application Server that the first user obtain authorisation, from a Policy and Charging Rules function associated with the first user, for additional Quality of Service for the second user in order that the second user can achieve the required Quality of Service, a processing unit for generating a Quality of Service authorisation request, the request including said required Quality of Service and the additional Quality of Service, a transmitter for sending the Quality of Service authorisation request to the Policy and Charging Rules function associated with the first user, a receiver for receiving a response to the request, the response including an indication that the required Quality of Service and the additional Quality of Service have been authorised, and a transmitter for notifying the Application Server that the Policy and Charging Rules function associated with the second user has authorised said additional Quality of Service.

The apparatus may further comprise a receiver for receiving a request from the Application Server to determine whether or not the first user is willing to provide the additional Quality of Service for the second user, a transmitter for sending a message to the first user requesting whether or not the first user is willing to provide the additional Quality of Service for the second user, a receiver for receiving a response from the first user, and a transmitter for notifying the Application Server of the response.

According to a tenth aspect of the present invention there is provided an apparatus configured to operate as an IP Multimedia Subsystem Proxy Call Session Control Function associated with a first user for facilitating a communication session between the first user and a second user at a required Quality of Service. The apparatus comprises a receiver for receiving a request from an Application Server to obtain authorisation, from a Policy and Charging Rules function associated with the first user, for the required Quality of Service, the request including an indication that additional Quality of Service has been authorised by a Policy and Charging Rules function associated with the second user, a processing unit for generating a Quality of Service authorisation request, the request including said required Quality of Service and an indication that the additional Quality of Service has been authorised, a transmitter for sending the Quality of Service authorisation request to the Policy and Charging Rules function associated with the first user, a receiver for receiving a response to the request, the response including an indication that the required Quality of Service has been authorised for the first user, and a transmitter for notifying the Application Server that the Policy and Charging Rules function associated with the first user has authorised the required Quality of Service.

The present invention provides that both the first and second users will have adequate QoS available to participate in the session. In addition, the network operator(s) involved in the communication will benefit from a successful establishment of a communication session.

BRIEF DESCRIPTION OF THE DRAWINGS

FIG. 9 illustrates schematically an example of an Application Server according to an embodiment of the present invention;

FIG. 10 illustrates schematically an example of a Policy and Charging Rules Function according to an embodiment of the present invention; and FIG. 11 illustrates schematically an example of a Proxy Call Session Control Function according to an embodiment of the present invention.

DETAILED DESCRIPTION

Figure 1:
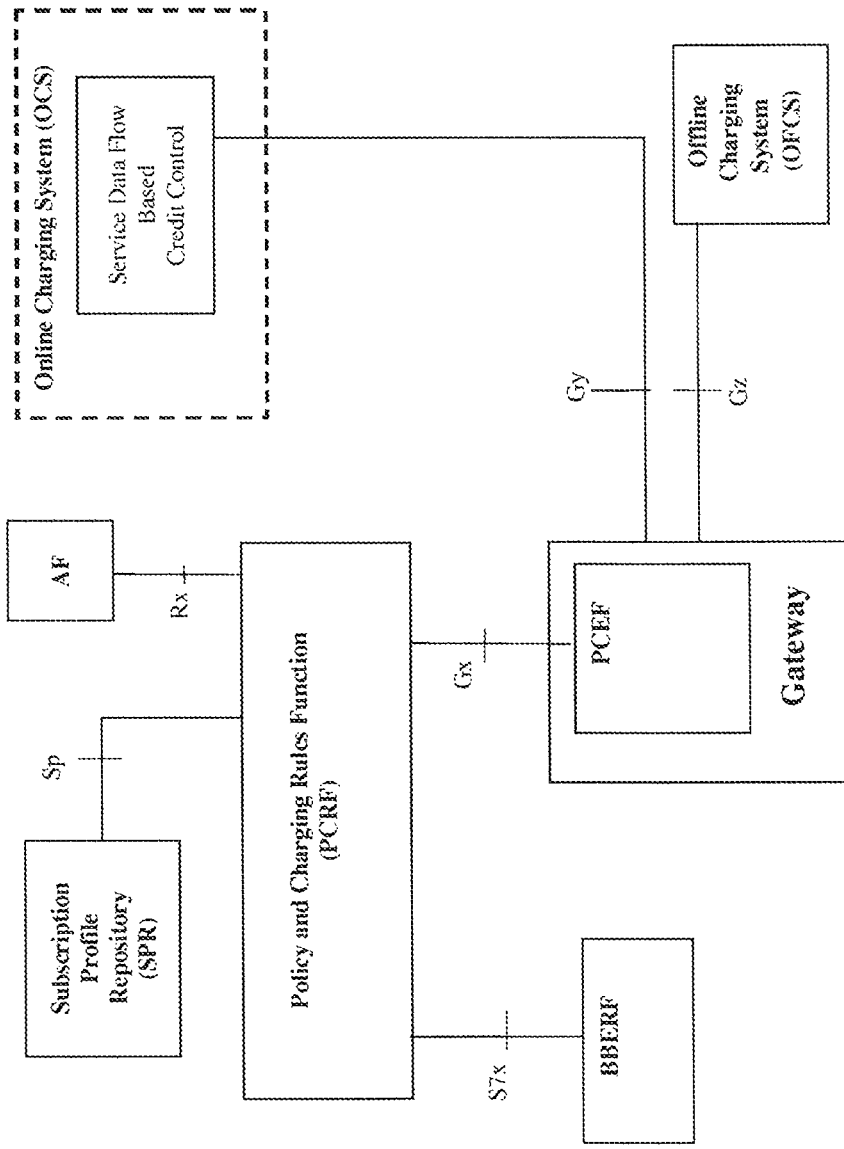
FIG. 1 illustrates schematically an example of PCC architecture employed in a General Packet Radio Service (GPRS) IP-CAN.
Figure 2:
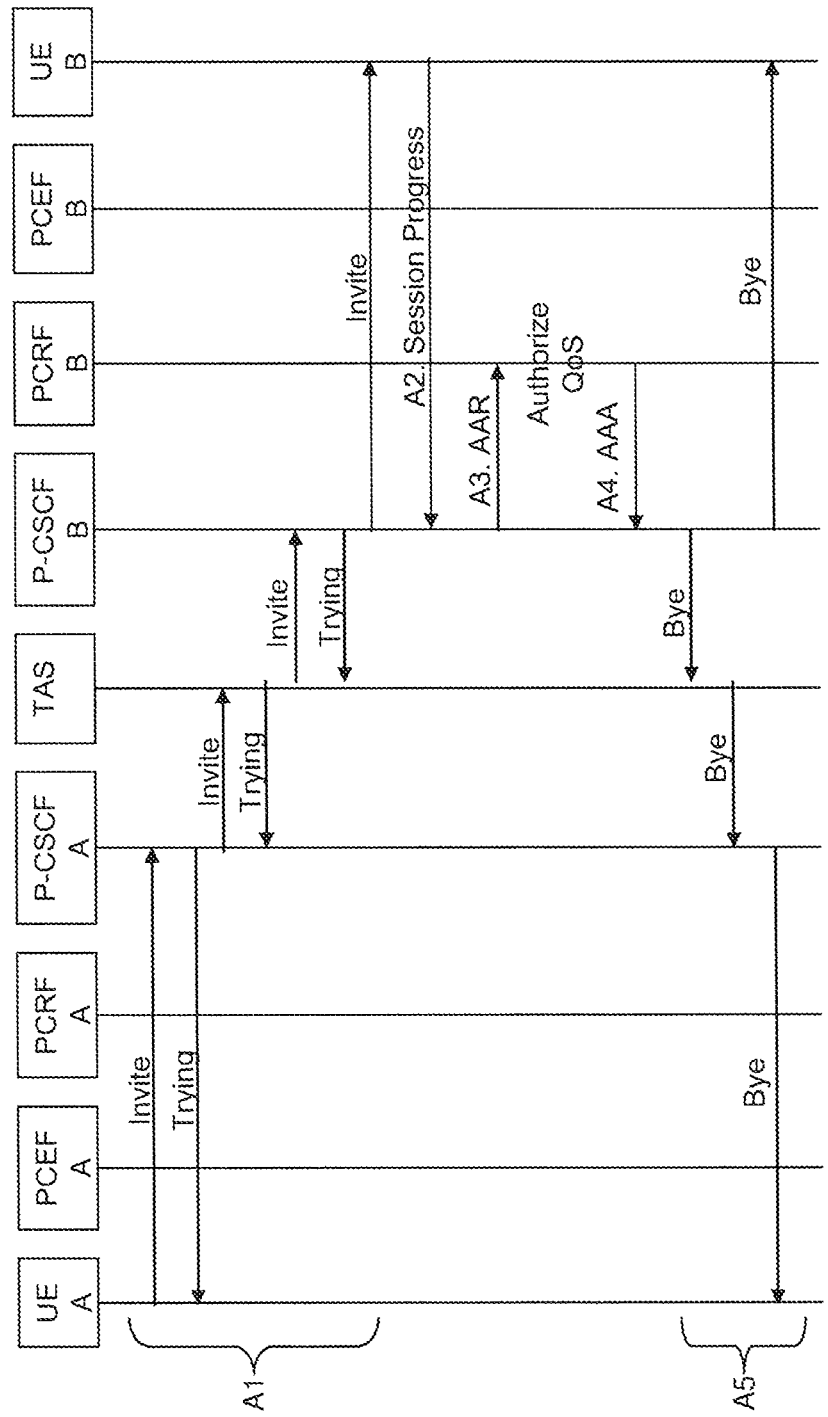
FIG. 2 illustrates an example signalling flow diagram of a video conference negotiation in an IM CN subsystem.

In order to overcome, or at least mitigate the problem identified above there will now be described a method of establishing a communication session between at least a first user and a second user, wherein the QoS allowed by the subscription of the second user does not meet the minimum QoS preferred or required for the session. In the method, the QoS available to the second user may be increased to at least the minimum desired QoS for the duration of the session, with additional or upgraded QoS provided by the first user. The first user can either pay for this additional or upgraded QoS, on behalf of the second user, or they can allow the second user to make use of the QoS allowed by their subscription. As a result, the communication between the first and second user can be successfully established even if the QoS available to the second user is insufficient/inadequate for a particular session.

If the first user allows the second user to make use of QoS allowed by their subscription, the QoS available to the first user is temporarily decreased. As such, the QoS allowed by the first user's subscription must be sufficient to provide the minimum desired QoS to the first user, as well as the additional or upgraded QoS required by the second user. In other words, the second user effectively borrows a portion of the QoS available to the first user.

For example, a first user and second user wish to establish a multimedia communication between them, the multimedia communication session having a minimum required bandwidth of 1.8 Mbps. If the first user's subscription restricts the bandwidth available to the first user to 3 Mbps, and the second user's subscription restricts the bandwidth available to the second user to 1 Mbps, then the method described here will provide that the second user can borrow 0.8 Mbps of bandwidth from that available to the first user. Therefore, for the duration of the multimedia communication between the first user and the second user, the second user will be provided with up to 1.8 Mbps, and the first user will be provided with up to 2.2 Mbps.

According to this method, if it is determined that the QoS restrictions of the subscription of a second user do not meet the QoS preferred or required for a particular communication session, then a request can be made to the first user to provide the additional or upgraded QoS required by the second user. This additional or upgraded QoS allows the second user to achieve the desired QoS. If the first user agrees to this request, then the QoS available to the second user will be increased, either at the expense of the first user, or using the QoS allowed by the subscription of the first user.

In doing so, the method provides that both the first and second users have adequate QoS available to use the service, and that the network operator(s) involved in the communication benefit from a successful establishment of a communication session. Furthermore, if the participating user's are sharing the QoS allowed by their subscriptions, then the network operator's can still apply a dynamic QoS policy that does not necessarily overload their network resources, since the total QoS available for the users remains the same. However, if the network resources available in the access network(s) are limited, the network operator(s) can still restrict the QoS provided to both the first and second users.

In one possible implementation, related to multimedia communication services in an IP Multimedia Subsystem (IMS) architecture, the method described above is performed as a supplementary service. In an IMS, supplementary services are implemented using a Telephony Application Server (TAS) that acts a Back to Back User Agent (B2BUA) i.e., it terminates two dialogs (SIP dialogs in this case). The TAS contains the service logic which provides the basic call processing services including digit analysis, routing, call setup, call waiting, call forwarding, conferencing, communication identification, reversed charging etc. The TAS will receive a notification that the desired QoS has not been authorised for one of the participating users and will then initiate a request towards another participating user to ask if he/she will agree to provide the additional or upgraded QoS that the other user requires in order to execute the service that is being negotiated. As such, the TAS will work as an intermediate node between both users for the negotiation of this QoS sharing service.

Figure 3A:
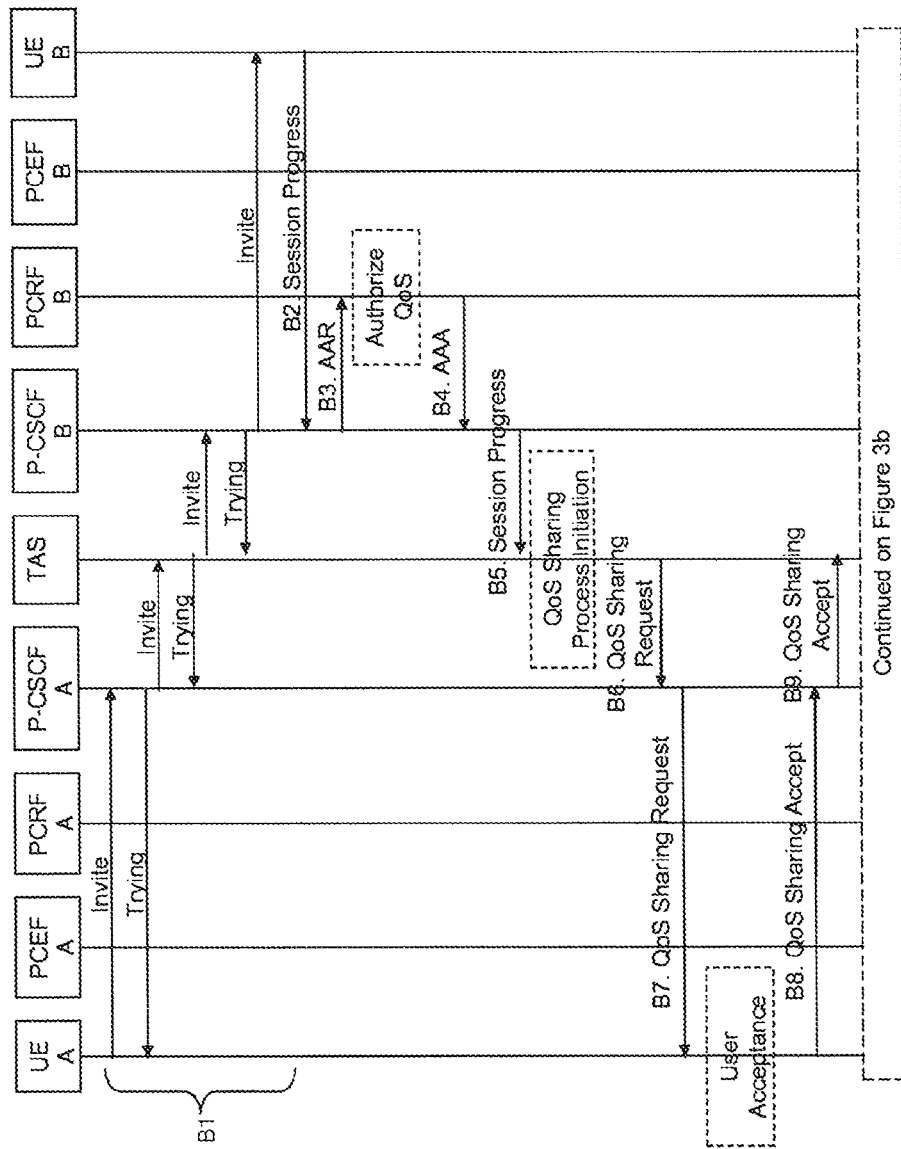
FIGS. 3a and 3b illustrate an example signalling flow diagram of a video conference negotiation in an IM CN subsystem according to an embodiment of the present invention.
Figure 3B:
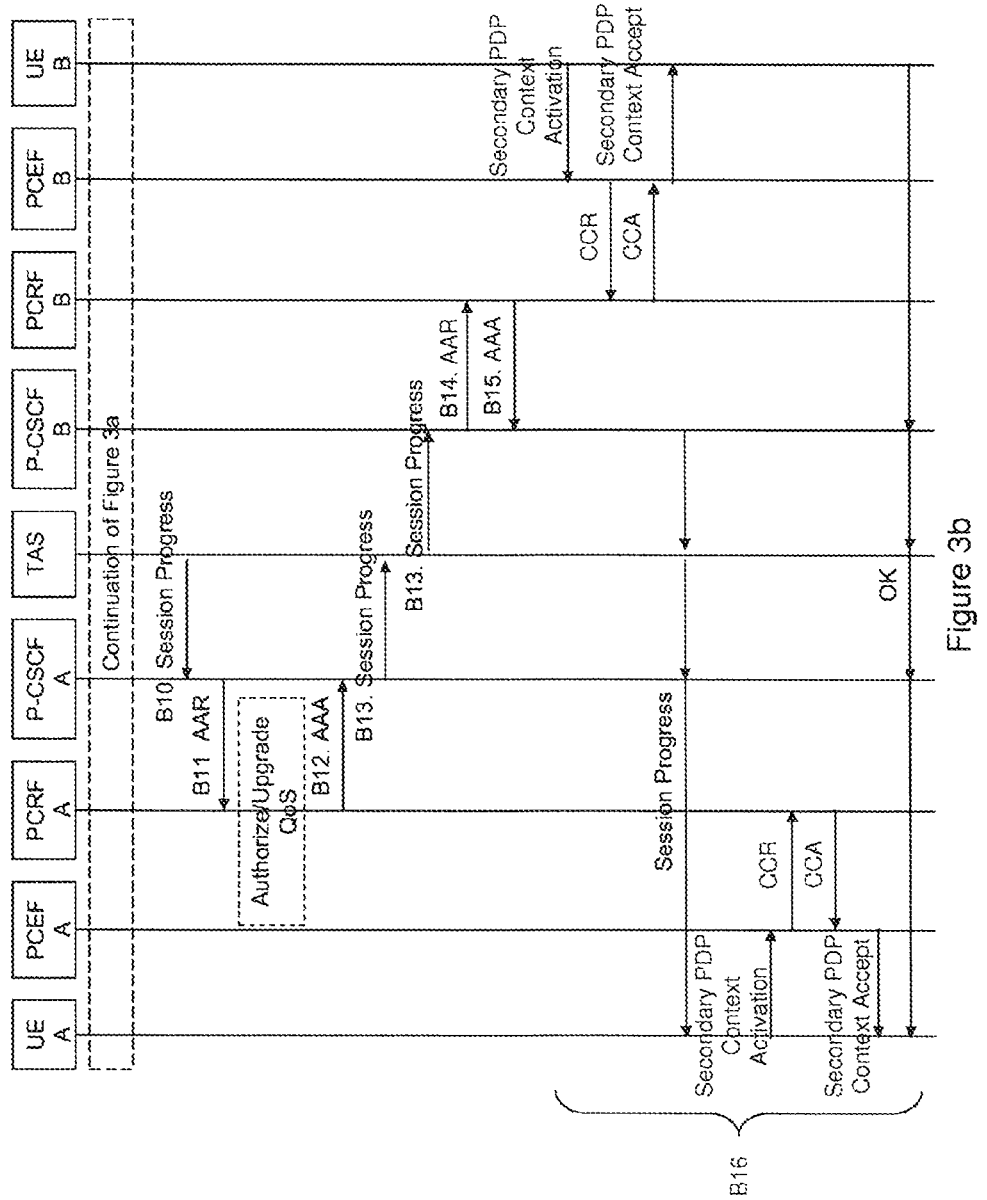

FIGS. 3a and 3b are an example signalling flow diagram of a video conference negotiation in an IM CN subsystem, wherein a QoS sharing service is provided as a supplementary service. In this example, the negotiation takes place between an originating user terminal (UE A) and a terminating user terminal (UE B). The videoconference service requires a bandwidth of 3 Mbps. The subscription of user A of UE A specifies a bandwidth limit of 5 Mbps, whilst the subscription of user B of UE B specifies a bandwidth limit of 2 Mbps. The steps performed are as follows:

B1. A SIP INVITE is sent from UE A to UE B in order to initiate the videoconference service. The SIP INVITE is routed via P-CSCF A associated with UE A, to a TAS, and onto P-CSCF B associated with UE B.

B2. UE B returns a 183 Session Progress message to P-CSCF B.

B3. P-CSCF B then sends an Authenticate and Authorize Request (AAR) message to PCRF B requesting authorisation of the required QoS. The Rx interface, between the P-CSCF and the PCRF, will require extension to include the QoS sharing information. For example, the QoS sharing information may include an indication that QoS sharing is requested, and the additional QoS (e.g. bandwidth) that is required.

B4. The PCRF B determines if the subscription of user B allows sufficient QoS to meet the minimum bandwidth of 3 Mbps. In this example, PCRF B does not authorise the QoS because the subscription of user B only provides a maximum bandwidth of 1 Mbps. PCRF B sends the rejection to P-CSCF B in an Authenticate and Authorize Answer (AAA) message, including an indication of the QoS deficit of user B (i.e. 2 Mbps).

B5. P-CSCF B notifies the TAS that the session initiation has failed due to the QoS limitations of the subscription of the user B. This notification also includes details of the QoS deficit of user B, therefore indicating the additional QoS required by the user B (i.e. 2 Mbps). For example, P-CSCF B may send a 183 Session Progress message to the TAS.

B6. The TAS then implements the QoS sharing procedure as a supplementary service by sending a SIP message to P-CSCF A including an indication that QoS sharing is requested and details of the additional QoS required by user B (i.e. 2 Mbps). For example, the SIP message may be a 380 Alternative Service message and may include an XML message body of the form:

```
<alternative-service>
    <type>
        <QoS-Sharing-Indication>
            <bandwidth-requested> 2 Mbps </bandwidth-requested>
        </QoS-Sharing-Indication>
    </type>
</alternative-service>
```

B7. P-CSCF A forwards the QoS sharing request to UE A.

B8. UE A receives the QoS sharing request and provides user A with the opportunity to accept or reject the request. In this example, user A accepts the request and UE A returns a SIP message indicating this acceptance to P-CSCF A.

B9. P-CSCF A forwards the QoS sharing acceptance to the TAS.

B10. The TAS then notifies P-CSCF A that the session has been accepted and includes an indication that QoS sharing is to be implemented together with details of the QoS parameters to be shared with user B. In this case, 2 Mbps of bandwidth is to be shared.

B11. P-CSCF A then sends an Authenticate and Authorize Request (AAR) message to PCRF A. The request includes the QoS parameters to be authorised for UE A, but also includes an indication that QoS sharing is to be implemented together with details of the QoS parameters to be shared with user B.

B12. Upon the receipt of the AAR with the QoS sharing indication from P-CSCF A. PCRF A evaluates the QoS and Charging rules that apply to user A. In this example, the subscription of user A provides a bandwidth limit of 5 Mbps, the videoconference session requires 3 Mbps and the bandwidth deficit of user B is 2 Mbps. As such, the PCRF-A assigns 3 Mbps to user A, and accepts the bandwidth sharing of 2 Mbps with user B. This authorisation is sent to P-CSCF A in an AAA message.

B13. P-CSCF A propagates the response from PCRF-A towards the TAS and P-CSCF B.

B14. P-CSCF B informs PCRF B that the QoS sharing has been accepted in a AAR message.

B15. PCRF B then evaluates the QoS and Charging rules that are to apply to user B. In the example, considering that user A is sharing 2 Mbps with user B, and that user B has a bandwidth limit of 1 Mbps, PCRF B authorizes the QoS request of 3 Mbps required for the videoconference and sends this authorisation to P-CSCF B in an AAA message.

B16. Following authorisation, the resources in the traffic plane are reserved by means of the initiation of the corresponding dedicated IP-CAN bearers that meet the negotiated QoS parameters.

It should be understood that this is a simplified example as, in practice, the service requirements and user subscriptions may well differentiate between uplink and downlink bandwidth as well as making provision for other QoS parameters. As such, the method described above could equally apply to any service and to any QoS parameters. In addition, prior to making use of QoS sharing, the network operator may require that a user subscribe to a QoS sharing service, for example, by an interaction between the user's UE and the TAS.

The example described above illustrates a scenario in which the participating users choose to make use of QoS sharing. However, any of the participating users may choose to reject the use of QoS sharing. For example, user A could reject the request, or P-CSCF A could deny the QoS sharing request (e.g. due to a lack of resources available for user A). In such a case, the TAS would receive the notification that QoS sharing has been rejected and then initiate termination of the session towards the participating users.

When implementing a QoS sharing service, the network operator(s) may provide the participating users with further options. For example, when a first user wishes to participate in a communication session with a second user, but the second user does not have sufficient QoS provision in their subscription, the first user can agree to implement QoS sharing. However, whilst the first user may have sufficient QoS provision in their subscription to participate in the session, they may not have sufficient QoS provision to also cover the deficit in the QoS provision of the second user. In this case, the first user may be given the option of paying for the additional or upgraded QoS required by the second user in order to cover this deficit. Alternatively, if the first user's subscription is not sufficient, the first user may have automatically configured the QoS sharing service to upgrade their rating group or subscription (e.g. for the duration of the session), in order to provide the additional or upgraded QoS to another user. This upgrade in the rating group or subscription of the first user will indicate that a different tariff is required, thereby indicating that the first user is to be charged for this upgrade. Furthermore, it may be the case that the network operator(s) may not want to allow user's to share the QoS allowed by their subscriptions, and may therefore only provide that the participating users can pay for the additional or upgraded QoS.

Figure 4:
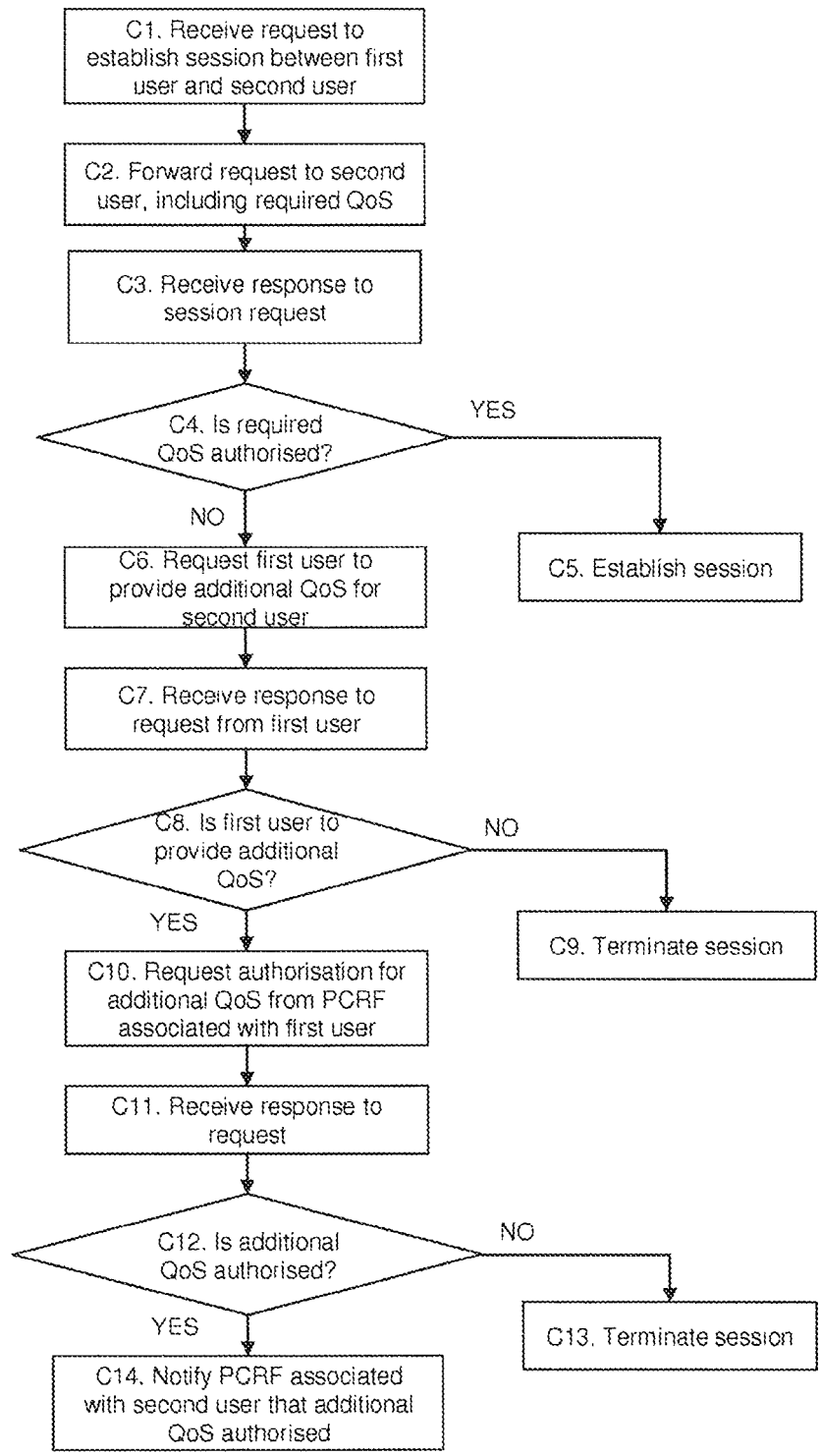
FIG. 4 illustrates an example of the process implemented by an Application Server according to an embodiment of the present invention.

FIG. 4 illustrates an example of the process implemented by an Application Server (AS) that supports a QoS sharing service. The steps performed are as follows:

C1. The AS receives a request to establish a communication session between a first user and a second user. For example, the request may have been sent from the first user to the AS, via a P-CSCF associated with the first user.

C2. The AS forwards this request towards the second user, via a P-CSCF associated with the second user, and includes in the request an indication of the QoS preferred or required for the session.

C3. The AS then receives a response to the session request.

C4. The AS determines whether or not the response indicates that the desired QoS has been authorised for the second user.

C5. If the desired QoS has been authorised for the second user, then the AS continues to establish the session according to standard procedures.

C6. If the desired QoS has not been authorised for the second user, and the response also indicates the additional or upgraded QoS required by the second user, then the AS sends a message towards the first user, requesting that the first user provide the additional or upgraded QoS for the second user. Alternatively, the first user may have pre-configured the QoS sharing service with their permissions, such that it is not necessary to request permission from the user on each occasion. In such circumstances, the permissions could indicate that QoS sharing is to occur automatically such that the process would continue from step C9.

C7. The AS then receives a response from the first user.

C8. The AS determines whether or not the first user is willing to provide the additional or upgraded QoS required by the second user.

C9. If the first user is not willing, then the session is terminated.

C10. If the first user is willing, then the AS sends a message to the P-CSCF associated with the first user indicating that authorisation of the additional QoS is required.

C11. The AS then receives a response from the P-CSCF associated with the first user.

C12. The AS determines whether or not the response indicates that a PCRF associated with the first user has authorised the additional QoS.

C13. If the PCRF has not authorised the additional QoS, then the session is terminated.

C14. If the PCRF has authorised the additional QoS, then the AS sends a message towards a PCRF associated with the second user, indicating that the additional or upgraded QoS has been authorised for the second user.

Where the AS is in an IM CN subsystem, the SIP protocol will require extension such that the QoS sharing information can be included. For example, the QoS sharing information may include, an indication the QoS sharing is requested, and the QoS that is required to be shared.

Figure 5:
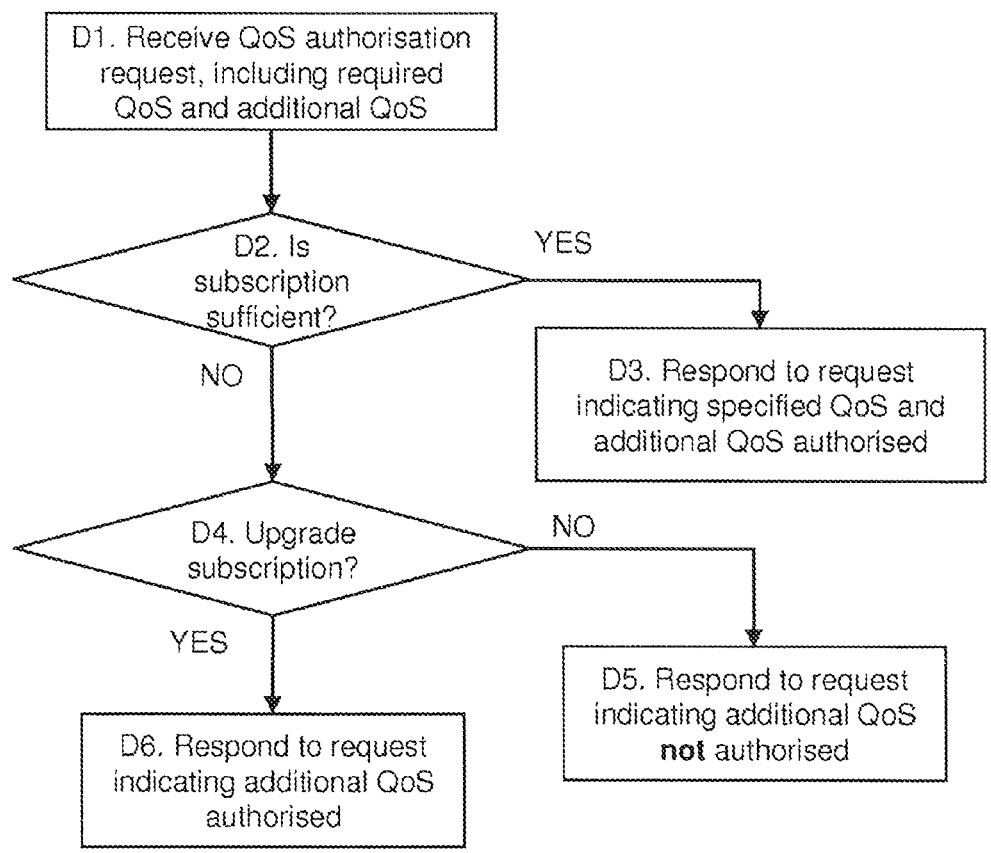
FIG. 5 illustrates an example of the process implemented by a Policy and Charging Rules Function according to an embodiment of the present invention.

FIG. 5 illustrates an example of the process implemented by a Policy and Charging Rules Function (PCRF) that supports a QoS sharing service, wherein the PCRF is associated with a first user who wishes to establish a communication session with a second user. In this case, the first user is willing to provide additional QoS for a second user. The steps performed are as follows:

D1. The PCRF receives a QoS authorisation request, the request including the QoS required by the first user associated with the PCRF and additional QoS required by the second user.

D2. The PCRF determines if the subscription of the first user allows sufficient QoS to provide both the QoS required by the first user and the additional QoS required by the second user.

D3. If the subscription is sufficient, then the PCRF responds to the request indicating that the QoS required by the first user and the additional QoS required by the second user have been authorised.

D4. If the subscription is insufficient, the PCRF then determines if it can upgrade the subscription of the first user, at the cost of the first user, in order to provide the QoS required by the first user and the additional QoS required by the second user. This may require the PCRF to request the permission of the first user, or determining whether or not this permission has been pre-configured for the first user.

D5. If the PCRF can not upgrade the subscription, then the PCRF responds to the QoS authorisation request, indicating that the QoS has not been authorised.

D6. If the PCRF can upgrade the subscription, then the PCRF responds to the QoS authorisation request, indicating that the QoS required by the first user and the additional QoS required by the second user have been authorised.

Figure 6:
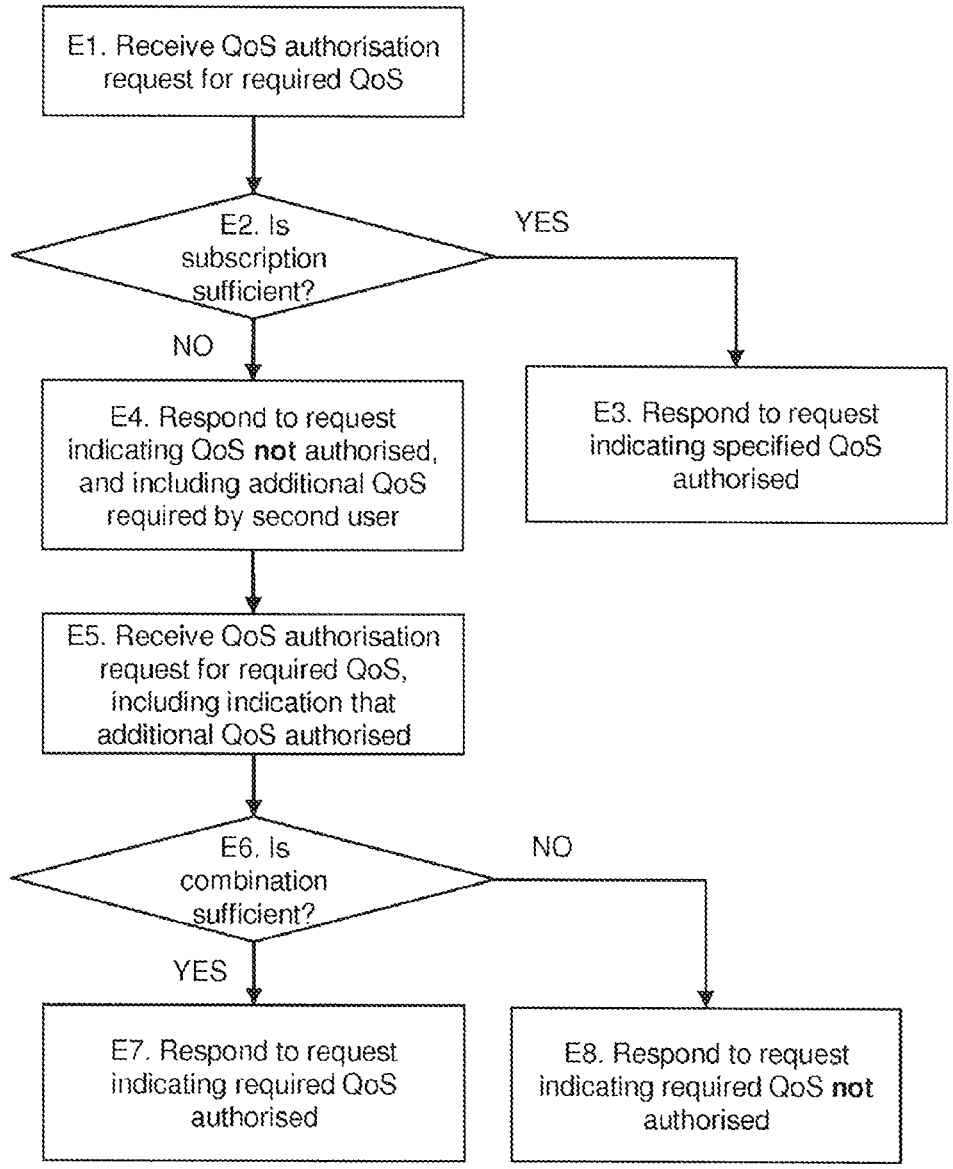
FIG. 6 illustrates an example of the process implemented by a Policy and Charging Rules Function according to an embodiment of the present invention.

FIG. 6 illustrates an example of the process implemented by a Policy and Charging Rules Function (PCRF) that supports a QoS sharing service, wherein a first user wishes to establish a communication session with a second user and the PCRF is associated with the second user. The steps performed are as follows:

E1. The PCRF receives a QoS authorisation request, the request including the QoS required by the second user.

E2. The PCRF determines if the subscription of the second user allows sufficient QoS to provide the QoS required for the session.

E3. If the subscription is sufficient, then the PCRF responds to the request indicating that the QoS required by the second user has been authorised.

E4. If the subscription is insufficient, the PCRF then determines the additional QoS that is required by the second user in order to achieve the QoS required for the session and responds to the request including an indication of this additional QoS.

E5. The PCRF may then receive a QoS authorisation request, the request including the QoS required by the second user and an indication that the additional QoS has been authorised by a PCRF associated with the first user.

E6. The PCRF then determines if the combination of the additional QoS with the QoS provided by the subscription of the second user is sufficient to provide the QoS required in order to participate in the session.

E7. If the combined QoS is sufficient, then the PCRF responds to the request indicating that the required QoS has been authorised for the second user.

E8. If the combined QoS is insufficient, the PCRF responds to the request indicating that the QoS has not been authorised for the second user.

Figure 7:
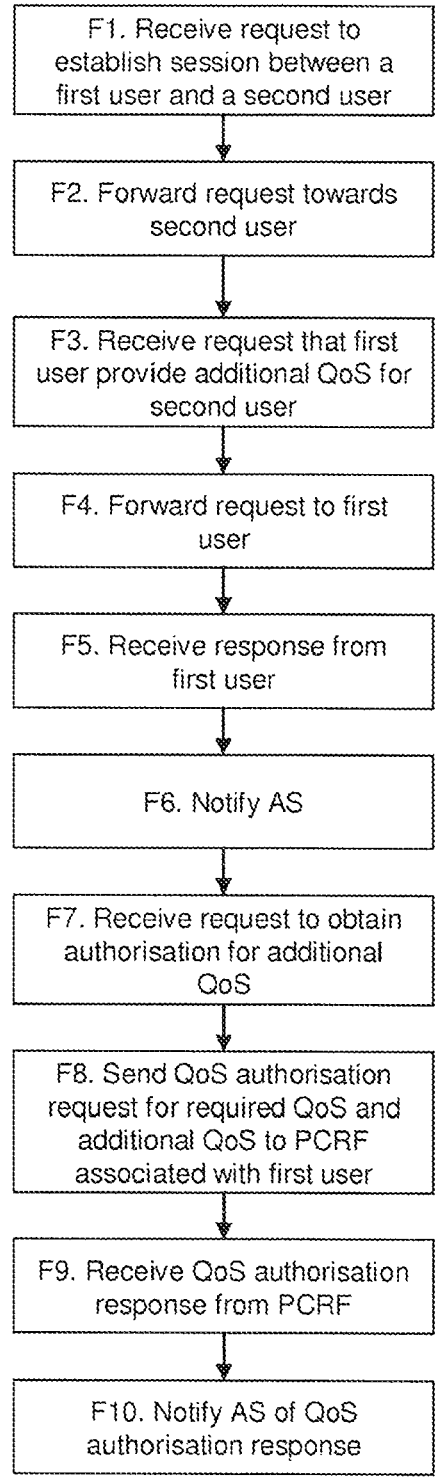
FIG. 7 illustrates an example of the process implemented by a Proxy Call Session Control Function according to an embodiment of the present invention.

FIG. 7 illustrates an example of the process implemented by a Proxy Call Session Control Function (P-CSCF) that supports a QoS sharing service, wherein the P-CSCF is associated with a first user who wishes to establish a communication session with a second user. The steps performed are as follows:

F1. The P-CSCF receives a request from the first user to establish a communication session with the second user.

F2. The P-CSCF forwards this request towards the second user.

F3. The P-CSCF then receives a message from an AS requesting that the first user provide additional QoS for the second user.

F4. The P-CSCF then forwards this request towards the first user. Alternatively, the first user may have pre-configured the QoS sharing service with their permissions, such that it is not necessary to request permission from the user on each occasion. In such circumstances, the permissions could indicate that QoS sharing is to occur automatically such that the process would continue from step F6.

F5. The P-CSCF then receives a response to this request from the first user, the response indicating whether or not the first user has accepted or rejected the request.

F6. The P-CSCF notifies the AS as to whether or not the first user is willing to provide additional QoS for the second user.

F7. The P-CSCF then receives a message from the AS requesting that the first user obtain authorisation for the additional QoS required by the second user, the request including an indication of the additional QoS.

F8. The P-CSCF then sends a QoS authorisation request (i.e. an AAA) to a PCRF associated with the first user, the request including the QoS required by the first user and the additional QoS required by the second user.

F9. The P-CSCF then receives a response (i.e. an AAR) from the PCRF, indicating whether or not the QoS required by the first user and the additional QoS required by the second user has been authorised.

F10. The P-CSCF notifies the AS of the authorisation response from the PCRF.

Alternatively, if the response from the PCRF indicates that the first user must pay for the additional QoS required by the second user, then the P-CSCF can send a request for permission to the first user. The P-CSCF will then forward any response from the first user to the PCRF, receive a further response from the PCRF and notify the AS of this authorisation response.

Once the PCRF associated with the second user has authorised the QoS for the second user, taking into account the additional QoS provided by the first user, the P-CSCF associated with the first user will receive an indication that it may proceed to establish the communication session. As such, the P-CSCF will then instruct the UE of the first user to reserve resources with the required QoS.

Figure 8:
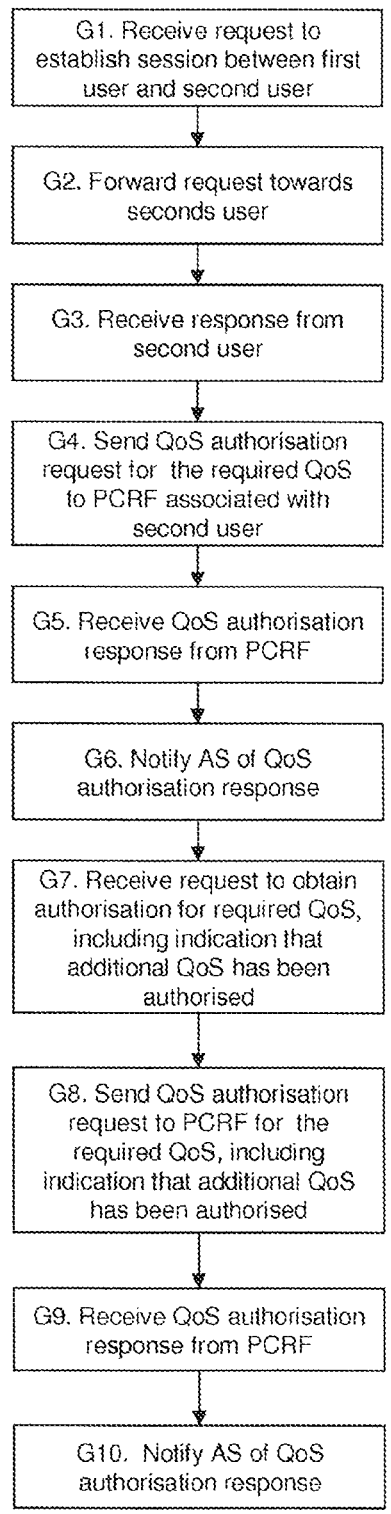
FIG. 8 illustrates an example of the process implemented by a Proxy Call Session Control Function according to an embodiment of the present invention.

FIG. 8 illustrates an example of the process implemented by a Proxy Call Session Control Function (P-CSCF) that supports a QoS sharing service, wherein a first user wishes to establish a communication session with a second user and the P-CSCF is associated with the second user. The steps performed are as follows:

G1. The P-CSCF receives a request from an AS to establish a communication session between the first user and the second user.

G2. The P-CSCF forwards this request towards the second user.

G3. The P-CSCF then receives a response from the second user indicating that the second user wishes to participate in the session and indicating the QoS required for the session.

G4. The P-CSCF then sends a QoS authorisation request (i.e. an AAA) to a PCRF associated with the second user, the request including the QoS required for the session.

G5. The P-CSCF then receives a response (i.e. an AAR) from the PCRF, indicating whether or not the QoS required has been authorised for the second user. If the response from the PCRF indicates that the required QoS has not been authorised, then the response will also include an indication of the additional QoS required by the second user in order to achieve the QoS required for the session.

G6. The P-CSCF notifies the AS of the authorisation response from the PCRF. If the response from the PCRF indicates that the required QoS has not been authorised, then the notification to the AS will include an indication of the additional QoS required by the second user.

G7. Assuming that the response from the PCRF received in step G5 indicates that the required QoS has not been authorised, then the P-CSCF subsequently receives a message from the AS requesting authorisation for the required QoS for the second user. This request includes an indication that the additional QoS required by the second user has been authorised by a PCRF associated with the first user.

G8. The P-CSCF then sends another QoS authorisation request (i.e. an AAA) to the PCRF associated with the second user, the request including the QoS required for the session and an indication that the additional QoS required by the second user has been authorised by a PCRF associated with the first user.

G9. The P-CSCF then receives a response (i.e. an AAR) from the PCRF, indicating whether or not the QoS required for the session has been authorised for the second user.

G10. The P-CSCF notifies the AS of the authorisation response from the PCRF.

Given that the additional QoS has been authorised by the PCRF associated with the first user, the response from the PCRF associated with the second user, in step G9, will indicate that the QoS required for the session has been authorised, based on a combination of the additional QoS with the QoS allowed by the subscription of the second user. As such, the P-CSCF will then instruct the UE of the second user to reserve resources with the required QoS.

FIG. 9 illustrates schematically an example of an AS 1 suitable for implementing the method described above. The AS 1 can be implemented as a combination of computer hardware and software. The AS 1 comprises a receiver 2, a processing unit 3 and a transmitter 4. The receiver 2 is suitable for receiving a notification that the PCRF associated with a second user has not authorised the QoS required for the session. This notification includes an indication of additional QoS required by the second user. The processing unit 3 then generates a request for authorisation for the additional QoS required by the second user. The transmitter 4 then sends this request to a PCRF associated with a first user, via the P-CSCF associated with the first user. The receiver 2 then receives a notification that the PCRF associated with the first user has authorised the additional QoS, and uses the transmitter 4 to notify the PCRF associated with the second user. This notification is transmitted to the PCRF via the P-CSCF. The transmitter 4 can also be used to send a request to the first user, requesting whether or not the first user is willing to provide the additional QoS to the second user, prior to requesting authorisation for the additional QoS. The response from the first user is received by the receiver 2.

FIG. 10 illustrates schematically an example of a PCRF 5 suitable for implementing the method described above. The PCRF 5 can be implemented as a combination of computer hardware and software. The PCRF 5 comprises a receiver 6, a processing unit 7 and a transmitter 8.

For a PCRF 5 associated with the first user, the receiver 6 is suitable for receiving a QoS authorisation request for the QoS required for the session and for the additional QoS required by the second user. The processing unit 7 then determines if the subscription of the first user allows sufficient QoS for both the required QoS and the additional QoS. The response to the request is then sent using the transmitter 8. In addition, if the subscription of the first user does allow sufficient QoS for both the required QoS and the additional QoS, then the processing unit 7 may also reduce the QoS available to the first user for the duration of the session, by an amount equivalent to the additional QoS. However, if the subscription of the first user does not allow sufficient QoS for both the required QoS and the additional QoS, then the processing unit 7 may determine if the subscription of the first user can be upgraded, at the cost of the first user, in order to provide the required QoS for the first user and the additional QoS for the second user. If so, the processing unit 7 will upgrade the subscription of the first user for the duration of the session.

For a PCRF 5 associated with the second user, the receiver 6 is suitable for receiving a QoS authorisation request, the request including the QoS required for the session. The processing unit 7 determines if the subscription of the second user allows sufficient QoS to provide the required QoS. If not, the processing unit 7 determines the additional Quality of Service required by the second user in order to achieve the required QoS. The transmitter 8 is then used to send the response to the request, including an indication that the required QoS has not been authorised and including an indication of the additional QoS required by the second user in order to achieve the required QoS. Furthermore, the receiver 6 is also suitable for receiving a further QoS authorisation request, including the QoS required for the session and an indication that the additional QoS has been authorised by a PCRF associated with the first user. The processing unit 7 then determines if a combination of the QoS allowed by a subscription of the second user and the additional QoS is sufficient to provide the required QoS. The transmitter 8 is then used to send the response to this further request, the response including an indication that the required QoS has been authorised for the second user. If the combination of the QoS allowed by a subscription of the second user and the additional QoS is sufficient to provide the required QoS, then the processing unit 7 may also increase the QoS available to the second user for the duration of the session, by an amount equivalent to the additional QoS.

FIG. 11 illustrates schematically an example of a P-CSCF 9 suitable for implementing the method described above. The P-CSCF 9 can be implemented as a combination of computer hardware and software. The P-CSCF 9 comprises a receiver 10, a processing unit 11 and a transmitter 12.

For a P-CSCF 9 associated with the first user, then the receiver 10 is suitable for receiving a request from an AS that the first user obtain authorisation for the additional QoS required by the second user. The processing unit 11 then generates a QoS authorisation request, including the required QoS and the additional QoS, and the transmitter 12 sends this QoS authorisation request to the PCRF associated with the first user. The receiver 10 then receives the response to this request, the response including an indication that the required QoS and the additional QoS have been authorised. The transmitter 12 is the used for sending a notification to the AS. Prior to requesting authorisation for the additional QoS, the receiver 10 can also receive a message from the AS, requesting whether or not the first user is willing to provide the additional QoS to the second user. The transmitter 12 is then used to send such a request to the first user. The response from the first user is received by the receiver 10, and notified to the AS using the transmitter 12.

For a P-CSCF 9 associated with the second user, the receiver 10 is suitable for receiving a request from the AS to obtain authorisation for the required QoS, the request including an indication that additional QoS has been authorised by a PCRF associated with the first user. The processing unit 11 generates a QoS authorisation request for the required Quality of Service, and including an indication that the additional QoS has been authorised. The transmitter 12 sends this QoS authorisation request to the PCRF associated with the second user. The receiver 10 then receives a response to the request, including an indication that the required QoS has been authorised for the second user, and a notification is sent to the AS using the transmitter 12.

The UE of the first user is required to receive the message from the AS requesting that the first user share their QoS with the second user. The UE then provides the first user with an opportunity to accept or reject this request and sends an appropriate response towards the AS.

The method described herein provides that the limitations on the QoS available to a user, due to the restrictions of their subscription, do not necessarily prevent them from participating in services with other users, which would otherwise have the effect of limiting the services available to those other users.

It will be appreciated by the person of skill in the art that various modifications may be made to the above-described embodiments without departing from the scope of the present invention.

The invention claimed is:

1. A method of operating a Policy and Charging Rules Function (PCRF) associated with a first user to establish a communication session between the first user and a second user at a required Quality of Service, the method comprising:
   receiving a Quality of Service authorisation request at a receiver of a PCRF, the request including said required Quality of Service required by the first user and an additional Quality of Service required by the second user;
   determining, by a processing circuit of the PCRF, if a subscription of the first user allows sufficient Quality of Service for both the required Quality of Service and the additional Quality of Service;
   if the subscription of the first user does allow sufficient Quality of Service for both the required Quality of Service and the additional Quality of Service, the processing circuit:
      generating a message comprising an indication that the required Quality of Service and the additional Quality of Service have been authorized; and
      transmitting the message via a transmitter at the PCRF to respond to the Quality of Service authorisation request; and
   if the subscription of the first user does not allow sufficient Quality of Service for both the required Quality of Service and the additional Quality of Service, the processing circuit:
      determining if the subscription of the first user can be upgraded, at the cost of the first user, in order to provide the required Quality of Service for the first user and the additional Quality of Service required by the second user; and
      if the subscription of the first user can be upgraded, upgrading the subscription of the first user, and responding to the Quality of Service authorisation request with an indication that the required Quality of Service and the additional Quality of Service have been authorised.

2. The method of claim 1 wherein if the subscription of the first user does allow sufficient Quality of Service for both the required Quality of Service and the additional Quality of Service, the Quality of Service available to the first user is reduced by an amount equivalent to the additional Quality of Service for the duration of the session.

3. The method of claim 1 wherein determining if the subscription of the first user can be upgraded comprises:
   sending a message to the first user requesting permission to upgrade the subscription of the first user.

4. The method of claim 1 wherein determining if the subscription of the first user can be upgraded comprises:
   determining whether or not permission to upgrade the subscription of the first user has been pre-configured for the first user.

5. A method of operating a Policy and Charging Rules Function (PCRF) associated with a first user to control the establishment of a communication session between the first user and a second user at a required Quality of Service, the method comprising:
   receiving a Quality of Service authorisation request at a receiver of a PCRF, the Quality of Service authorisation request including said required Quality of Service required by the first user;
   determining, by a processing circuit of the PCRF, if a subscription of the first user allows sufficient Quality of Service for the required Quality of Service; and
   if the subscription of the first user does not allow sufficient Quality of Service for the required Quality of Service, the processing circuit:
      determining an additional Quality of Service required by the first user in order to achieve said required Quality of Service;
      generating a message comprising an indication that the requested Quality of Service has not been authorized, and the additional Quality of Service required by the first user; and
      transmitting the message via a transmitter at the PCRF to respond to the Quality of Service authorisation request;
   receiving a further Quality of Service authorisation request at the receiver of a PCRF, the further Quality of Service authorisation request including said required Quality of Service required by the first user and an indication that the additional Quality of Service has been authorised by a Policy and Charging Rules function associated with the second user;
   determining, by the processing circuit of the PCRF, if a combination of the Quality of Service allowed by a subscription of the first user and the additional Quality of Service is sufficient for the required Quality of Service; and
   if the combination of the Quality of Service allowed by a subscription of the first user and the additional Quality of Service is sufficient for the required Quality of Service, responding to the request with an indication that the required Quality of Service has been authorised.

6. The method of claim 5 wherein if the combination of the Quality of Service allowed by a subscription of the first user and the additional Quality of Service is sufficient for the required Quality of Service, the Quality of Service available to the first user is increased by an amount equivalent to the additional Quality of Service for the duration of the session.

7. An apparatus configured to operate as a Policy and Charging Rules Function associated with a first user for establishing a communication session between the first user and a second user at a required Quality of Service, the apparatus comprising:
   a receiver configured to receive a Quality of Service authorisation request, the Quality of Service authorisation request including said required Quality of Service and an additional Quality of Service required by the second user;
   a processing circuit configured to:
      determine if a subscription of the first user allows sufficient Quality of Service for both the required Quality of Service and the additional Quality of Service;
      generate a message comprising an indication that the required Quality of Service and the additional Quality of Service have been authorized; and
      if the subscription of the first user does allow sufficient Quality of Service for both the required Quality of Service and the additional Quality of Service, reduce the Quality of Service available to the first user for the duration of the session by an amount equivalent to the additional Quality of Service; and a transmitter configured to transmit the message to respond to the Quality of Service authorisation request.

8. The apparatus of claim 7 wherein the processing circuit is further configured to:
   determine if the subscription of the first user can be upgraded, at the cost of the first user, in order to provide the required Quality of Service for the first user and the additional Quality of Service required by the second user; and
   if the subscription of the first user can be upgraded, upgrade the subscription of the first user.

9. An apparatus configured to operate as a Policy and Charging Rules Function (PCRF) associated with a first user for controlling the establishment of a communication session between the first user and a second user at a required Quality of Service, the apparatus comprising:
   a receiver configured to:
      receive a Quality of Service authorisation request, the Quality of Service authorisation request including said required Quality of Service; and
      a further Quality of Service authorisation request, the further Quality of Service authorisation request including said required Quality of Service and an indication that the additional Quality of Service has been authorised by a Policy and Charging Rules function associated with the second user;
   a processing circuit configured to:
      determine if a subscription of the first user allows sufficient Quality of Service for the required Quality of Service, and, if the subscription of the first user does not allow sufficient Quality of Service for the required Quality of Service:
         determine the additional Quality of Service required by the first user in order to achieve said required Quality of Service;
         generate a message comprising an indication that the requested Quality of Service has not been authorized, and the additional Quality of Service required by the first user; and
         determine if a combination of the Quality of Service allowed by a subscription of the first user and the additional Quality of Service is sufficient for the required Quality of Service;
   a transmitter configured to:
      transmit the message to respond to the Quality of Service authorisation request; and
      transmit the further Quality of Service authorisation request with an indication that the required Quality of Service has been authorised.

10. The apparatus of claim 9 wherein the processing circuit is further configured to increase the Quality of Service available to the first user for the duration of the session by an amount equivalent to the additional Quality of Service, if a combination of the Quality of Service allowed by a subscription of the first user and the additional Quality of Service is sufficient for the required Quality of Service.

* * * * *